UNITED STATES PATENT OFFICE.

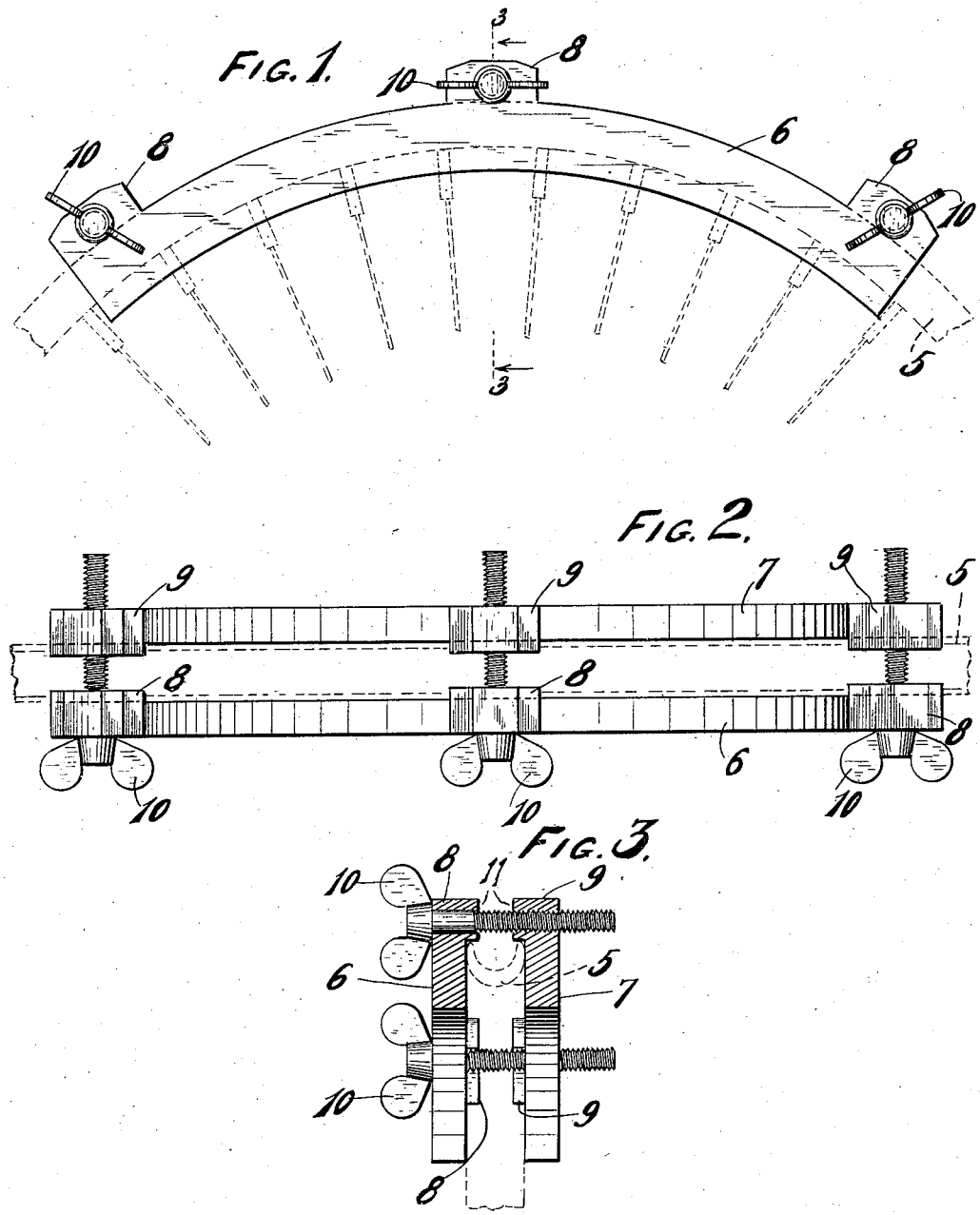

HENRY J. BOOSTED, OF KENOSHA, WISCONSIN.

BICYCLE-WHEEL-RIM STRAIGHTENER.

1,012,593.  Specification of Letters Patent.  Patented Dec. 26, 1911.

Application filed May 18, 1911. Serial No. 628,090.

*To all whom it may concern:*

Be it known that I, HENRY J. BOOSTED, a citizen of the United States, residing in Kenosha, in the county of Kenosha and State of Wisconsin, have invented new and useful Improvements in Bicycle-Wheel-Rim Straighteners, of which the following is a description, reference being had to the accompanying drawings, which are a part of this specification.

This invention relates to improvements in wheel rim straighteners and more particularly to straighteners which are adapted to hold bicycle wheel rims while the spokes thereof are being assembled therein and adjusted to a uniformity of tension.

It is one of the objects of this invention to provide a rim straightener which is simple in construction and operation and which is inexpensive to manufacture.

A further object of the invention is to provide a rim straightener which is adapted to true and securely clamp portions of a wheel rim and to hold the same until the spokes are assembled and adjusted thereto.

A further object of the invention is to provide a rim straightener of semi-circular form and having projecting lugs to properly position the wheel rim therebetween.

With the above, and other objects in view, the invention consists of the wheel rim straightener and its parts and combinations as set forth in the claims, and all equivalents thereof.

In the accompanying drawing in which the same reference characters indicate the same parts in all of the views, Figure 1 is a side view of the improved rim straightener shown in connection with a portion of a bicycle wheel, the wheel being shown by dotted lines; Fig. 2 is a top view thereof; and Fig. 3 is a transverse sectional view thereof taken on line 3—3 of Fig. 1.

Referring to the drawing the numeral 5 indicates the rim of a bicycle wheel and 6 and 7 the arc-shaped clamping jaws of the straightener which are adapted to be positioned on opposite sides of the wheel rim. The arc-shaped jaws are of strong heavy material and are of a radius corresponding to the radius of the wheel rims so that a rim may be clamped therebetween and held with its side edges on a flat plane. The peripheral edges of the arc-shaped jaws are provided with radial ears 8 and 9 through which extend thumb screws 10 for clamping the two jaws together. These thumb screws extend loosely through the ears 8 and are threaded in the ears 10.

In order to properly position the straightener on the wheel rim laterally extending projections 11 are provided which extend inwardly toward each from opposite ears. These projections are adapted to abut against the periphery of the rim when the rim is placed between the clamping jaws in position to be clamped.

In use a portion of the rim of a wheel is placed between the jaws of the straightener with the periphery of the rim abutting against the positioning projections of the straightener. The thumb screws are now turned to securely clamp and straighten the rim between the jaws. The spokes are now connected to the rim and are adjusted to a uniform tension and when so adjusted the clamped portion of the rim is released and another portion is positioned between the jaws and the operation repeated until the wheel is completed and all of the spokes are under equal tension.

From the foregoing description it will be seen that the wheel rim straightener is very simple in construction and operation and it is well adapted for the purpose desired.

What I claim as my invention is:

A rim straightener, comprising a pair of arc-shaped clamping jaws having apertured ears projecting radially therefrom, said ears provided with inwardly extending rim positioning projections, and screws extending through the apertures of the ears for drawing the jaws clampingly toward each other.

In testimony whereof, I affix my signature, in presence of two witnesses.

HENRY J. BOOSTED.

Witnesses:
ROBERT V. BAKER,
H. R. BLOMBERG.

---

Copies of this patent may be obtained for five cents each, by addressing the "Commissioner of Patents, Washington, D. C."